(12) United States Patent
Forrest et al.

(10) Patent No.: US 8,803,029 B2
(45) Date of Patent: Aug. 12, 2014

(54) DUAL BEAM LASER WELDING HEAD

(75) Inventors: Mariana G. Forrest, Troy, MI (US); Feng Lu, Farmington Hills, MI (US); Stefan Heinemann, Ann Arbor, MI (US); Torsten Schmidt, Plymouth, MI (US)

(73) Assignee: Chrysler Group LLC, Auburn Hills, MI (US)

(*) Notice: Subject to any disclaimer, the term of this patent is extended or adjusted under 35 U.S.C. 154(b) by 1587 days.

(21) Appl. No.: 11/469,961

(22) Filed: Sep. 5, 2006

(65) Prior Publication Data

US 2008/0029498 A1 Feb. 7, 2008

Related U.S. Application Data

(60) Provisional application No. 60/821,357, filed on Aug. 3, 2006.

(51) Int. Cl.
*B23K 26/067* (2006.01)
*B23K 26/06* (2014.01)

(52) U.S. Cl.
CPC ......... *B23K 26/0604* (2013.01); *B23K 26/0608* (2013.01); *B23K 26/067* (2013.01)
USPC ............. 219/121.73; 219/121.76; 219/121.77

(58) Field of Classification Search
USPC ............. 219/161.63, 121.64, 121.77, 121.74; 148/525
See application file for complete search history.

(56) References Cited

U.S. PATENT DOCUMENTS

| | | |
|---|---|---|
| 2,987,610 A | 6/1961 | Steigerwald |
| 3,131,289 A | 4/1964 | Hansen |
| 3,151,231 A | 9/1964 | Steigerwald |
| 3,159,419 A | 12/1964 | Kerby |
| 3,165,619 A | 1/1965 | Cohen |
| 3,626,140 A | 12/1971 | Peyrot |
| 3,746,831 A | 7/1973 | Sciaky |
| 3,860,784 A | 1/1975 | Brown et al. |
| 3,881,084 A | 4/1975 | Baardsen |

(Continued)

FOREIGN PATENT DOCUMENTS

| | | |
|---|---|---|
| EP | 121 661 A1 | 1/1984 |
| EP | 229 159 B1 | 7/1987 |

(Continued)

OTHER PUBLICATIONS

M. G. Forrest and F. Lu—"Development of a Novel Dual Beam Configuration Leading to Significant improvement in Process Robustness for Laser Lap Joining of Zinc Coated Steel Sheets with Zero Gap at the Interface", *Proceedings of ALAC 2004* (Automotive Laser Applications Conference), Sep. 20-22, 2004, Ann Arbor, MI, USA, (2004).

(Continued)

*Primary Examiner* — Tu Hoang
*Assistant Examiner* — Thien S Tran
(74) *Attorney, Agent, or Firm* — Ralph E. Smith (57) ABSTRACT

A laser welding head capable of producing a plurality of beams that are proficient in providing a unique keyhole. The welding head is movable through a plurality of positions relative to substrates that enables the plurality of beams to engage the substrates in a manner that welds the substrates in a variety of stack-up positions. A welding method using the welding head is also provided.

15 Claims, 6 Drawing Sheets

(56) References Cited

U.S. PATENT DOCUMENTS

| | | | |
|---|---|---|---|
| 4,121,087 A | 10/1978 | Malmuth et al. | |
| 4,237,363 A | 12/1980 | Lemelson | |
| 4,251,709 A | 2/1981 | Schumacher | |
| 4,304,979 A | 12/1981 | Dietrich et al. | |
| 4,315,130 A * | 2/1982 | Inagaki et al. | 219/121.6 |
| 4,379,219 A | 4/1983 | Behrens et al. | |
| 4,574,176 A | 3/1986 | Sharp | |
| 4,577,088 A | 3/1986 | Sharp | |
| 4,591,688 A | 5/1986 | Koch et al. | |
| 4,628,179 A | 12/1986 | Crahay | |
| 4,650,954 A | 3/1987 | Frings et al. | |
| 4,656,332 A | 4/1987 | Gross et al. | |
| 4,665,294 A | 5/1987 | Hira et al. | |
| 4,667,080 A | 5/1987 | Jüptner et al. | |
| 4,673,794 A | 6/1987 | Ireie et al. | |
| 4,691,093 A | 9/1987 | Banas et al. | |
| 4,737,612 A | 4/1988 | Bruch et al. | |
| 4,751,365 A | 6/1988 | La Rocca et al. | |
| 4,769,522 A | 9/1988 | Lentz et al. | |
| 4,803,334 A | 2/1989 | Burke et al. | |
| 4,827,100 A | 5/1989 | Frings et al. | |
| 4,899,030 A | 2/1990 | Miyazaki et al. | |
| 4,902,872 A | 2/1990 | Frings et al. | |
| 4,942,285 A | 7/1990 | Ishikawa et al. | |
| 4,945,202 A | 7/1990 | Büdenbender | |
| 4,990,741 A | 2/1991 | Moores et al. | |
| 5,120,926 A | 6/1992 | Marriott | |
| 5,155,323 A | 10/1992 | Macken | |
| 5,183,989 A | 2/1993 | Sanders et al. | |
| 5,245,156 A | 9/1993 | Kamogawa et al. | |
| 5,250,783 A | 10/1993 | Nishi et al. | |
| 5,268,556 A | 12/1993 | Coyle, Jr. et al. | |
| 5,347,528 A | 9/1994 | Haruta et al. | |
| 5,410,123 A | 4/1995 | Rancourt | |
| 5,430,816 A | 7/1995 | Furuya et al. | |
| 5,478,983 A | 12/1995 | Rancourt | |
| 5,515,194 A * | 5/1996 | Kanterakis et al. | 398/48 |
| 5,591,359 A | 1/1997 | Saitou et al. | |
| 5,624,585 A | 4/1997 | Haruta et al. | |
| 5,798,867 A * | 8/1998 | Uchida et al. | 359/629 |
| 6,040,787 A * | 3/2000 | Durham | 340/932.2 |
| 6,084,717 A * | 7/2000 | Wood et al. | 359/629 |
| 6,184,490 B1 * | 2/2001 | Schweizer | 219/121.77 |
| 6,608,278 B1 | 8/2003 | Xie et al. | |
| 6,782,167 B2 * | 8/2004 | Wood et al. | 385/47 |
| 2001/0030983 A1 * | 10/2001 | Yuri et al. | 372/29.023 |
| 2005/0056627 A1 * | 3/2005 | Gross et al. | 219/121.77 |
| 2005/0218127 A1 * | 10/2005 | Kettner-Reich | 219/121.73 |
| 2006/0157455 A1 * | 7/2006 | Kawai | 219/121.63 |
| 2006/0157457 A1 * | 7/2006 | Sakurai et al. | 219/121.76 |

FOREIGN PATENT DOCUMENTS

| | | | | |
|---|---|---|---|---|
| EP | 233 091 A1 | 8/1987 | | |
| EP | 0 429 369 A1 | 5/1991 | | |
| EP | 429 368 A1 | 5/1991 | | |
| GB | 1 336 806 A | 11/1973 | | |
| GB | 2 200 067 A | 7/1988 | | |
| JP | 54-018441 | 2/1979 | | |
| JP | 54-112352 | 9/1979 | | |
| JP | 55-094786 | 7/1980 | | |
| JP | 55-136585 | 10/1980 | | |
| JP | 57-142781 | 9/1982 | | |
| JP | 58-125380 | 7/1983 | | |
| JP | 60-121093 | * 6/1985 | | B23K 26/00 |
| JP | 59-097281 | * 11/1985 | | B23K 26/00 |
| JP | 61-169184 | 7/1986 | | |
| JP | 61-255773 | 11/1986 | | |
| JP | 61-255774 | 11/1986 | | |
| JP | 63-252346 | 10/1988 | | |
| JP | 64-075192 | 3/1989 | | |
| JP | 03-180286 | 8/1991 | | |
| JP | 04-210883 | 7/1992 | | |
| JP | 05-318154 | 12/1993 | | |
| JP | 06-007984 A | 1/1994 | | |
| JP | 06-182573 | 7/1994 | | |
| JP | 06-190575 | 7/1994 | | |
| JP | 06-198472 | 7/1994 | | |
| JP | 09-300087 | * 11/1997 | | B23K 26/04 |
| JP | 200-362202 | * 6/2002 | | B23K 26/00 |
| JP | 2000-362202 | * 6/2002 | | B23K 26/00 |

OTHER PUBLICATIONS

Forrest, Mariana G. and F. Lu, "Design of an Advanced Dual Beam Laser Head for Lap Welding of Zinc-Coated Steel Sheets with Zero Gap at the Interface"—*Proceedings of ALAW 2005* (Automotive Laser Applications Workshop), Plymouth, MI, Apr. 13-14, 2005.

M. G. Forrest, F. Lu and W. A. Marttila, "Process Development for Dual Beam Laser Welding of Zinc-Coated Steel Sheets in Lap Joint Configuration without gap control at the interface"—*CD Proceedings of the IIW 2005*—International Institute of Welding—"Advances in Automotive Joining Technologies" Workshop, Jul. 12, 2005, Prague, Check Republic.

Forrest, M.G. and Lu, F., "Development of an Advanced Dual Beam Head for Laser Lap Joining of Zinc Coated Steel Sheet Without Gap At the Interface", *Proceedings of ICALEO 2005*, (International Congress on Applications of Lasers and Electro-Optics 2005), Oct. 31-Nov. 3, 2005, Miami, FL.

Steigerwald, K, 25 Years of Deep-Penetration Electron Beam Welding, pp. 1-2.

Elmer et al., Beam Profile Analysis for the S&MS B231 Electron Beam Welding Machines, LLNL, Technical Information Department, Lawrence Livermore National Laboratory, University of California, Jun. 12, 1997, pp. 1-21.

Mazumder, I, Laser-Beam Welding, ASM Handbook, vol. 6; Welding, Brazing and Soldering, Policy of Units of Measure, ASM International, Dec. 1993, pp. 1-18.

Hiramoto et al., Deep Penetration Welding with High Power CO2 Laser, Proceedings of International Conference on Laser Advanced Materials Processing Science and Applications, May 21-23, 1987, pp. 1-7.

Armenskii, E, Drilling Circular Holes With an Elliptical Electron Beam, Physics and Chemistry of materials Treatment, vol. 22, Issue 2, Mar.-Apr. 1988, pp. 116-118.

Xie, J, Dual Beam Laser Welding, Welding Journal, Oct. 2002, pp. 223-S-230-S.

Miyake et al., Experiment on the Focusing of High Power Millimeter-Wave Beam, Transactions of JWRI, vol. 18, No. 2, Welding Research Institute of Osaka University 1989, pp. 169-174.

Haruta et al., High Power Pulse YAG laser Welding of Thin plate, Proceedings of International Conference on Laser Advanced materials Processing, Science and Applications, Jun. 7-12, 1992 pp. 499-505.

Eichorn, F., High Energy Density Welding-Future Research Directions, International Congress on Welding Research, Jul. 13-14, 1984, pp. 169-171.

Anderson, S., Holographic Imaging Aids Automobile Designers, LaserFocus World, Feb. 1999, p. 5.

Quigley, M., Chapter 8 High Power Density Welding, The Physics of Welding, The International Institute of Welding 1984, pp. 268-291.

Albright et al., High-Speed Laser Welding Discontinuities, Journal of Laser Applications, Fall 1988, pp. 18-25.

Mombo-Caristan et al., High Speed High power Laser Blank Cutting and Welding, ICALEO '99, Laser Materials Processing Conference; Proceedings: Nov. 15-18, 1999, pp. 23-21.

Fowler et al., Ignition and Maintenance of Subsonic Plasma Waves in Atmospheric Pressure Air by CW CO2 Laser Radiation and Their Effect on Laser Beam Propagation, Journal of Applied Physics, American Institute of Physics, 1975; 46(1): pp. 138-150.

Mackon et al., Diode-pumped Nd:YAG Laser for Precision Laser Machining, Journal of Laser Applications, Laser Institute of America, Apr. 1996;8, pp. 225-232.

Jones et al., CO2 Laser Welding of Aluminum Alloys, Proceedings of International Conference on Laser Advanced Materials Processing Science and Applications, Jun. 1992, pp. 523-528.

(56) References Cited

OTHER PUBLICATIONS

Polk et al., Laser Processing of Materials, United Technologies Research Center, pp. 357-365.
Miller C., Laswer Welding Article, U.S. Laser Corporation, available at http://www.uslaswercorp.com/envoy/welding.html, Sep. 25, 2006, pp. 1-8.
Huntington et al., Laswer Welding of Aluminum and Aluminum Allys, AWS Annual Convention, Apr. 1982, Welding Research Supplement, pp. 105-s-108-s.
Mannik et al., Laswer Welding of Steels: Relationship Between Laser Power, Penetration Depth, Welding Speed and Beam Polarization, ICALEO 1990, pp. 364-373.
Darchuk et al., The Basics of Laser Welding, Lasers & Applications, Mar. 1985, pp. 59-66.
Williams et al., Melt-Pool and Keyhole Dynamics During Thin Plate Laser Welding of Steel, SPIE vol. 1810 Gas Flow and Chemical Lasers, 1992, pp. 594-598.
Swift-Hook et al., Penetration Welding With Lasers, Welding Journal, Nov. 1973, pp. 492-s-499-s.
Forrest et al., Process Development for Dual Beam Laser Welding of Zinc-Coated Steel Sheets in Lap Joint Configuration Without Gap control at The Interface, IIW 2005, International Institute of Welding-Advances in Automotive Joining Technologies Workshop, 2005, pp. 1-10.
Hoffman et al., Process-Optimizing Adaptive Optics for the Beam Delivery of High-Power CO2 Lasers, Proceedings of SPIE--The International Society for Optical Engineering, vol. 1834, Apr. 1993, pp. 195-205.
Forrest et al., Recent Results on Improved Weld Quality for Laser Lap Welding of Zinc-Coated Steel Sheets Without Gap at the Interface, Sheet Metal Welding Conference XI, May 2004, pp. 1-7.
Ducharme et al., The Laser Welding of Thin Metal Sheets: An Integrated Keyhole and Weld Pool Model With Supporting Experiments, J. Phys, D: Appl. Phys. 27, 1994, pp. 1619-1627.
Powers et al., How High-Energy-Density Beam Welding manufactures Transmission Components, Welding Journal, vol. 47, pp. 47-54.
Deutscher Verband fur Schweisstechnik, Welding and Cutting by High-Power Lasers Having a Rectangular Beam Cross Section, DVS Beriched No. 99, Beam Technology, Proceedings 2nd International Conference, Germany, pp. 78-80, Fig. 7.
Bergman et al., Laser Material Processing with 18kW Using a Variable Beam Profile Achieved with a Deformable Optic, University Erlangen-Nürnberg, Germany, pp. 363-369.
Weldingh et al., Very Deep Penetration Laser Welding Techniques and Limitations, 8th NOLAMP Conference, 2001, pp. 1-10.
Parker et al., Industrial Lasers and Their Applications, Chapter 12, pp. 217-231, Prentice Hall, Inc. 1985.
Kuvin B., Laser and Electron Beams for Deep, Fast Welding, Welding Design & Fabrication, Aug. 1985, pp. 34-40.
Kielwasser et al., Physical Process During Pulsed ND: YAG Laser and CW-CO2 Laser Welding of Zinc Coated Steel, Laser Apps. Auto Industry-ICALEO 2000, pp. A10-A21.

Banas C., High Power Laser Welding, The Industrial Laser Annual Handbook 1986 Edition, SPIE vol. 629, pp. 65-375.
Aruga et al., Efficient and High-Quality Overlap Welding of Car-Body Aluminum Alloy Metal Sheets with High Power Nd:YAG Laser by Flexible Fiber Beam Delivery, Proceedings of International Conference on Laser Advanced Materials Processing Science and Applications: Jun. 1992, Osaka japan, pp. 517-522.
Bagger et al., Process Behaviour During High Power CO2 Laser Welding of Zinc Coated Steel, Proceedings of international Conference on Laser Advanced Materials Processing Science and Applications, Jun. 1992, Osaka Japan, pp. 553-557.
Dawes C., Laser Welding of Sheet Metal Fabrications—Process Improvements, Laser Welding, Machining, and Materials Processing: Proceedings of The International Congress on Applications of Lasers and Electro Optics, ICALEO Nov. 1985, pp. 73-80.
Dawes et al., Laser Welding of Deep Drawing Steel Sheet and Microalloyed Steel Plate, Second International Congress on Applications of Lasers and Electro Optics, Nov. 1983, pp. 73-79.
Haferkamp et al., Laser Beam Welding of HSS-Components for Car-Bodies, Proceedings: 25th ISATA Silver Jubilee International Symposium on Automotive Technology and Automation 1992, Osaka, Japan, pp. 173-179.
Katayama et al., Pulse Shape Optimization for Defect prevention in Pulsed Laser Welding of Stainless Steels, ICALEO 1993: Laser Materials Processing: proceedings: Oct. 1993, pp. 487-497.
Kimura et al., Welding Properties With High Power Pulsed CO2 Laser, Proceedings of International Conference on Laser Advanced Materials Processing Science and Applications, May 1987, Osaka, Japan, pp. 169-174.
Kymal C., Laser Welding in High Production, Second International Congress on Applications of Lasers and Electro-Optics, Nov. 1983, vol. 38, pp. 90-96.
Minamida et al., Butt Welding of Thin Stainless Steel Sheets With the 'Rippled Mode' Nd-YAG Laser, ICALEO '91: laser Materials Processing: Nov. 1991, pp. 168-177.
Mombo-Caristan et al., Seam Geometry Monitoring for Tailored Welded Blanks, ICALEO '91: Laser Materials Processing, Nov. 1991, pp. 123-132.
Shinmi et al., Laser Welding and Its Applications for Steel Making Process, Laser Welding, machining, and materials processing: proceedings of the International Congress on Applications of Lasers and Electro-Optics, ICALEO Nov. 1985, pp. 65-72.
Ross et al., Advances in Laser Welding of Automotive Parts, Proceedings: 25th ISATA Silver Jubilee International Symposium on Automotive Technology and Automation, Jun. 1992, pp. 165-171.
Sharp C., Development and Implementation of High Speed Laser Welding in The Can Making Industry, Proceedings of International Conference on Laser Advanced materials Processing Science and Applications, May 1987, pp. 541-547.
Llewellyn S., Laser Welding of High-Speed Roll-Formed Products, Lasers in Manufacturing: Proceedings of The 4th International Conference, May 1987, IFS (Publications) Ltd, Bedford, UK, pp. 297-301.

* cited by examiner

DUAL BEAM LASER WELDING HEAD

RELATED APPLICATION(S)

This application claims the benefit of Provisional Application Ser. No. 60/821,357, filed Aug. 3, 2006, which is incorporated by reference herein.

FIELD OF THE INVENTION

The present invention relates to laser welding systems adapted to provide a plurality of laser beams.

BACKGROUND OF THE INVENTION

The statements in this section merely provide background information related to the present disclosure and may not constitute prior art.

Laser welding has been known and used in the automotive industry, as well as other industries, for some time. Generally, it is known to use lasers to weld steel plates together. It is common to coat these steel plates with a protective coating that inhibits rust and other materials that reduce the useful life of the plates. The use of coatings, such as a zinc coating, for example, results in the plates being galvanized or galvannealed. The use of a coating on the plates, however, causes problems when welding the plates together. That is, the boiling temperature of materials used to coat the plates is different than a melting temperature of the steel used in the plates. As such, when welding the coated plates together, the coating may boil and infiltrate the molten pool of the weld and cause it to spatter, become porous, or both. The spattering and porousness of the weld results in the weld being mechanically weak and prone to corrosion.

To overcome the infiltration of the coating into the molten pool it is common to weld the coated plates together when they are separated from each other by a gap. This gap assists the coating in its gaseous form to be expelled through the gap away from the molten pool. Notwithstanding, the use of a gap is impractical due to increases in manufacturing time and cost.

Accordingly, there is a need for an improved laser welding system that reduces spattering and porous welds that are caused by the coating of the plates infiltrating the molten pool of the weld and causing the weld to spatter or become porous. Moreover, it is desirable to be able to weld a pair of coated plates together without having any gap between them.

SUMMARY OF THE INVENTION

The present teachings have been developed to overcome the drawbacks of conventional welding systems. In this regard, the present teachings provide a laser welding head capable of producing a plurality of beams that are proficient in providing a unique keyhole. The welding head is movable through a plurality of positions relative to substrates that enables the plurality of beams to engage the substrates in a manner that welds the substrates in a variety of stack-up positions. A welding method using the welding head is also provided.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
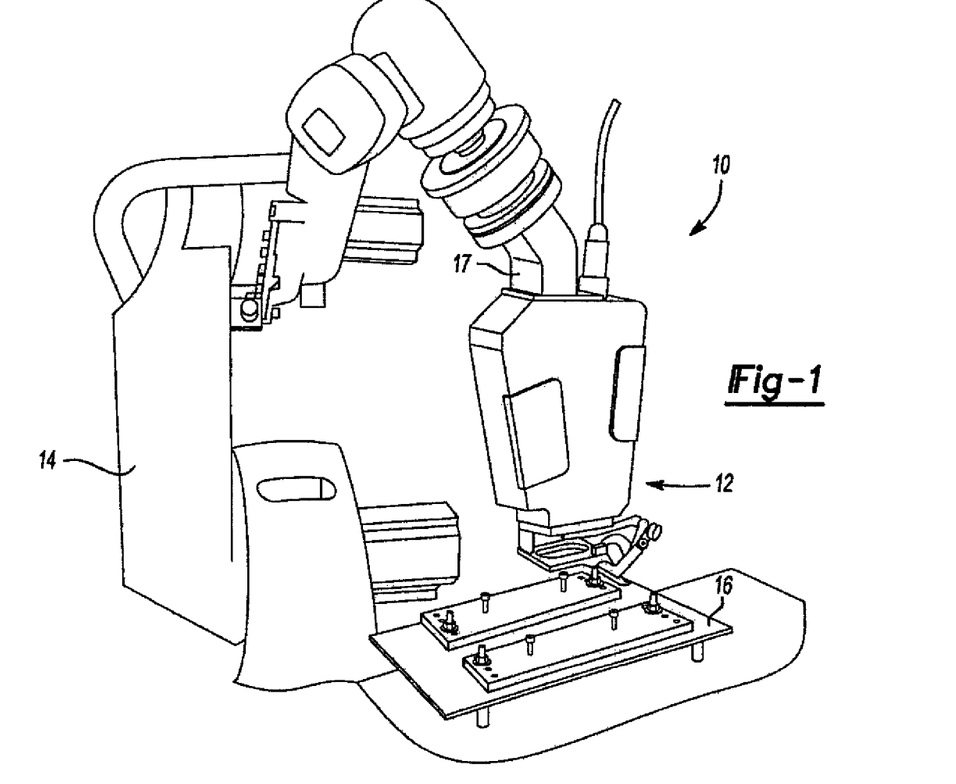
FIG. 1 is a perspective view of a laser system according to the present teachings.

Referring to FIG. 1, the laser welding system according to the present teachings will now be described. As shown in FIG. 1, the laser system 10 includes a laser head 12 that is movable through a plurality of positions by a machine such as a robot 14. The laser head 12 is movable by the robot 14 relative to a substrate stage 16. In this regard, the robot 14 is capable of moving the laser head 12 in the x-, y-, and z-axis directions. Further, the robot 14 is capable of rotating the laser head 12 about the z-axis through 360°, as well as rotating the head 12 through a plurality of points relative to the x- and y-axes. In this manner, the laser head 12 is movable through a locus of points that is substantially hemispherical in nature. It should also be understood, however, that the substrate stage 16 is movable through a plurality of positions (i.e., in the x-, y-, and z-axis directions) relative to the laser head 12, as well as angularly movable relative to the laser head 12. Further, other devices capable of moving the head 12 include a gantry or any other motion system known to one skilled in the art.

Figure 2A:
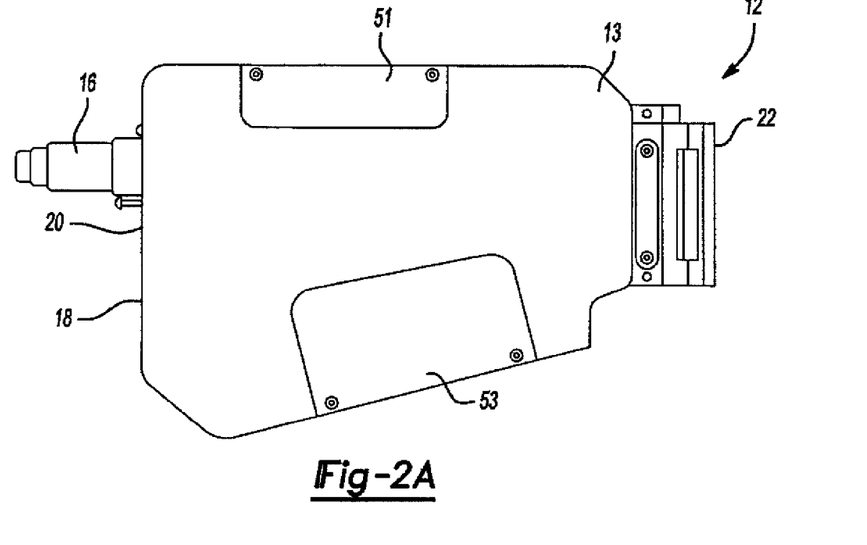
FIG. 2A is a top perspective view of a laser head of the laser system according to the present teachings.
Figure 2B:
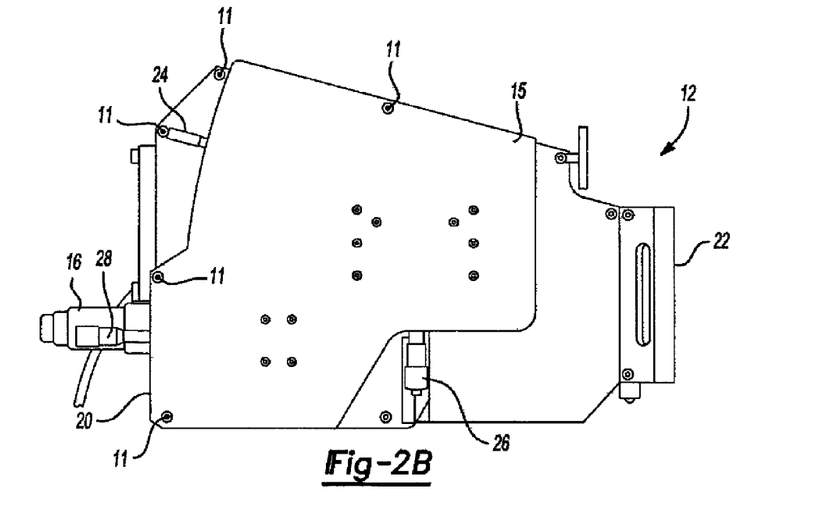
FIG. 2B is a bottom perspective view of the laser head of the laser system according to the present teachings.

Now referring to FIG. 2A, FIG. 2B, and FIG. 3, the laser head 12 of the laser welding system 10 will now be described. As shown in FIGS. 2A and 2B, the head 12 is formed of housing cover 13 attached by fasteners such as a plurality of screws 11 to a housing plate 15. Attached by housing plate 15 is a mounting flange 17 that connects the head 12 to robot 14. The head 12 houses a laser device 16. The laser device 16 is comprised of a fiber laser receptor that is connected to an outer surface 18 at a first end 20 of the housing 13. In other words, the laser device 16 is attached to the housing 13 at an inlet portion 20. The laser device 16 is capable of emitting a laser or some other type of energy from the inlet portion 20 to a second end 22, or output portion 22. Although the present embodiment is described using a fiber laser receptor as the laser device 16 for emitting a laser beam, it should be understood that any device known in the art sufficient for emitting a concentrated form of energy that may be focused and reflected may be used with the present teachings without departing from the spirit and scope thereof. In this regard, by non-limiting examples, devices that may be used in the laser welding system 10 according to the present teachings include a Nd:YAG laser, a diode laser, an electron beam emitter, and the like. As for a power of the laser device, it is preferable to use a device adapted to emit energy in the range between 4 kW to 10 kW.

The head 12 includes a plurality of adjustment devices 24, 26, and 28 for adjusting various parameters of the laser head 12 including an adjustment of the angle between a first and second beam (knob 24), an adjustment of the inter-spot distance between the first and second beams (knob 26), and an adjustment of a power ratio between the first and second beams (knob 28). These adjustment devices extend from housing cover 13, but are connected to various instruments inside the head 12 that are mounted to housing plate 15.

Figure 3:
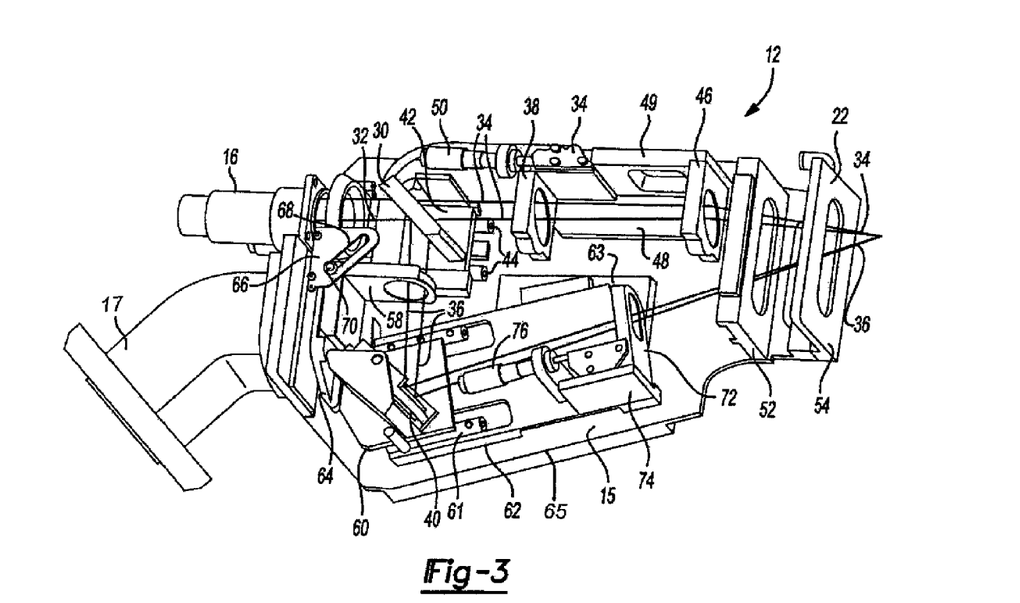
FIG. 3 is a perspective view of the laser head with a housing cover removed from the laser head.

Referring now to FIG. 3, it can be seen that housing cover 13 has been removed from housing plate 15 to expose the devices within the head 12. Inward (i.e., within the housing cover 13 from the inlet 20) from the laser device 16 is a beam splitter 30. The beam splitter 30 is a device adapted to reflect and transmit the energy 32 emitted by the laser device 16. That is, the beam splitter 30 is adapted to split the laser emitted energy 32 into a leading beam 34 and a trailing beam 36.

To split the energy beam 32, the beam splitter 30 is a device formed to have aperture (not shown) which deflects the radiation (i.e., energy) 32 emitted from the laser device 16 with a higher divergence, and lets radiation 32 with a lower divergence pass through downstream (i.e., toward the outlet 22). More specifically, as the energy beam 32 enters the housing 13 from laser device 16, it diverges or spreads outward. As the beam 32 contacts the beam splitter 30, radiation that has spread too far (i.e. the higher divergence radiation) contacts the beam splitter at positions outside of the aperture. This higher divergence radiation is reflected by the beam splitter 30 downward to form the trailing beam 36. Radiation 32 that has not spread too far (i.e., the lower divergence radiation) arrives at the beam splitter 30 and is able to pass through the aperture downstream toward a second end (outlet 22) of the head 12 to form the leading beam 34. In this manner, as stated above, the beam splitter 30 is adapted to reflect and transmit the energy 32 emitted by the laser device 16.

The radiation 32 with a low divergence passes through the aperture towards a collimator 38. This lower divergence radiation that passes through the aperture of the beam splitter 30 toward the collimator 38 will, as stated above, subsequently form a first beam 34 or "leading beam" 34. Because the beam splitter 30 reflects the radiation 32 with a higher divergence, the quality of the leading beam 34 is increased, and reduced spot sizes of the leading beam 34 can be achieved which allows larger depth of focus. Further, clipping the outer parts of the radiation 32 also enables an angle between the leading and trailing beams 34 and 36 that is smaller than a full divergence of a single beam. By the phrase "leading beam," it is meant a first laser beam to engage substrates to be welded. The so-called leading beam 34 is generally used to weld at least a pair of substrates together, as well as open a keyhole that will be described later. Controlling parameters of the leading beam 34 such as its spot size, power, and the like also enable increasing the welding speed with the leading beam 34. For example, a smaller spot size is advantageous in achieving increased welding speeds, which in turn increases productivity.

The radiation 32 with the higher divergence is deflected downward toward a reflecting mirror 40. The higher divergence radiation deflected by the beam splitter 30 will, as also stated above, subsequently form a second beam 36 or "trailing beam" 36. By the phrase "trailing beam," it is meant a second laser beam to engage substrates to be welded. The trailing beam 36 is generally for controlling a shape of the keyhole that is formed during welding. In this regard, controlling parameters of the trailing beam 36 such as its spot size, power, as well as angle relative to the leading beam 34 increase the ability of the leading beam 36 to control the formation of the keyhole. Controlling formation of the keyhole is advantageous in controlling a quality of the weld between substrates.

The beam splitter 30 is slidably movable along an optical axis (i.e., along an axis that travels from the inlet portion 20 to the outlet portion 22 of the head 12) of the leading beam 34 to adjust a power ratio of the leading beam 34. More particularly, the beam splitter 30 is positioned on a stage 42 that is slidably movable in a direction from the inlet 20 of the housing cover 13 toward the outlet 22 of the housing cover 13 along a track 44. The stage 42 is threadingly connected to the track 44, and to move the beam splitter 30, the adjustment device 28 (see FIG. 2B) that extends from the inlet 20 side of the housing cover 13 may be rotated to rotate the track 44 in a manner that the stage 42 translates along the threading (not shown) of the track 44.

To increase the power ratio of the leading beam 34 compared to the trailing beam 36, the beam splitter 30 is moved along track 44 to a position closer to inlet portion 20. In this manner, more radiation 32 with a lower divergence is allowed to pass through the aperture of the beam splitter 30. To decrease the power ratio of the leading beam 34 compared to the trailing beam 36, the beam splitter 30 is moved along track 44 to a position farther away from inlet portion 20 (i.e., toward outlet 22). In this manner, the radiation 32 emitted from laser device 16 is allowed to diverge or spread further, which in turn lessens the amount of lower divergence radiation that passes through the aperture of the beam splitter 30. Regardless, it should be understood that adjustment of the beam splitter 30 relative to the laser device 16 enables the power of each beam to be adjusted relative to the other. Preferably, however, the ratio of power of the leading beam 34 compared to the trailing beam 36 is 75:25. More preferably the ratio is between 80:20 or 45:55. Although the above ratios are preferred, it should be understood that any power ratio between the two beams may be used without departing from the spirit and scope of the present teachings.

The leading beam collimating lens 38 and a leading beam focusing lens 46 are located downstream from the beam splitter 30. The collimating lens 38 is mounted to a support bracket 48. Support bracket 48 is a substantially L-shaped bracket that is fixedly mounted to housing plate 15. Due to the beam splitter 30 being slidably movable, a distance between the beam splitter 30 and the leading beam collimating lens 38 is variable depending on the desired power ratio of the beams 32 and 34. This is beneficial to maintain proper collimation of the low divergence radiation that is allowed to pass through the beam splitter 30. A collimating lens 38 is a device that reduces the divergence of the radiation.

After the leading beam 34 passes through the leading beam collimating lens 38, the beam 34 travels downstream toward the leading beam focusing lens 46. The focusing lens 46 is mounted to a slide bracket 49 that is slidably coupled to the support bracket 48. Slide bracket 49 is connected to support bracket 48 via a track (not shown), which in turn is coupled to an adjustment device 50 that may be rotated to move the slide bracket 48 and lens 46 along a surface of support bracket 48 in a manner that can focus and un-focus the leading beam 34. Adjustment device 50 can be reached by removing removable plate 51 from housing cover 13 (see FIG. 2A).

The leading beam focusing lens 46 focuses the radiation to the desired focal plane. After passing through the leading beam focusing lens 46, the leading beam 34 passes through a cover glass 52 and cross jet device 54 located at an outlet 22 of the head 12. Cover glass assembly 52 is a removable piece mounted to housing plate 15. Cover glass assembly 52 may be removed as needed for cleaning or when the assembly 52 needs to be replaced. Cover glass assembly 52 prevents spattering from entering the head 12 to protect the optical components of the head 12 from becoming damaged. Just downstream from cover glass 52, cross jet device 54 is fixedly mounted to outlet portion 22 of housing plate 15. Cross jet device 54 deflects any spattering that occurs during the welding process from contacting or landing on cover glass assembly 52.

The radiation 32 with a higher divergence is deflected by the beam splitter 30 toward a mirror 40. After being deflected by the beam splitter 30, the radiation passes through a trailing beam collimating lens 58 that reduces the divergence of the radiation. The trailing beam collimating Tens 58 is mounted to the stage 42 that supports the beam splitter 30 and, accordingly, is slidably moveable therewith. The radiation passes through the trailing beam collimating lens 58 toward the trailing beam reflective mirror 40.

The trailing beam reflective mirror 40 is mounted to a mounting plate 60 that is slidably moveable in a direction from the inlet side 22 of the head 12 to the outlet side 22 of the head 12. In this manner, the reflective mirror 40 can maintain a proper optical alignment with beam splitter 30 and all other optical components in all six axes (i.e., the x-, y-, and z-axes, and three angles of rotation). That is, the reflective mirror 40 is movable to stay dynamically aligned with beam splitter 30. The mounting plate 60 is in turn mounted to a trailing beam adjustment plate 62. Preferably, the reflective mirror 40 is formed of copper and may be water cooled to enable the reflective mirror 40 to reflect the radiation 32 emitted by the high power laser device 16.

To slidably move the reflective mirror 40 to stay in proper optical alignment with the beam splitter 30, the mounting plate 60 is connected via an attachment bracket 64 to a panel 66 including a slot 68. Panel 66 is in turn fixed to trailing beam collimator 58. The slot 68 is angularly oriented relative to mounting plate 60 such that when the adjustment device 28 that extends from the housing cover 13 is rotated to move stage 42 and collimator 58, a pin 70 located on the collimator 58 that is engaged with the slot 68 is moved through positions in the slot 68 that slides the mounting plate 60 along tracks 61 formed on a surface of the trailing beam adjustment plate 62. As the reflective mirror 40 is slidably movable upon actuation of adjustment device 28, the reflective mirror 40 can be actuated to stay optically in-line with beam splitter 30 and collimator 58.

The reflective mirror 40 is also movable to adjust an angle between the leading beam 34 and the trailing beam 36. To adjust the angle between the beams 34 and 36, the reflective mirror 40 may be moved either toward or away from the collimator 58 and beam splitter 30. To actuate the mirror 40 in this manner, the mirror 40 is pivotably mounted to mounting plate 60. By rotation of adjustment knob 24, mirror 40 is pivoted such that the mirror 40 is moved toward or away from collimator 58 and beam splitter 30. As the mirror 40 pivots in this manner, the mirror 40, and angle of the mirror 40, is independently adjustable such that an angle of the trailing beam 36 relative to the leading beam 34 is adjustable.

Preferably, the angle of the trailing beam 36 relative to the leading beam 34 is adjustable between the angles of 10 to 20 degrees. More preferably, the angle between the trailing beam 36 relative to the leading beam 34 is adjustable between the angles of 10 to 15 degrees. Notwithstanding, one skilled in the art will acknowledge and appreciate that design of the optical system in laser head 12 may be modified to accommodate any angle between the leading and trailing beams as may be desired. Regardless, the minimum angle between the two beams 32 and 34 is less than a divergence of the entering radiation 32.

After reflection of the trailing beam 36 by the trailing beam reflecting mirror 40, the trailing beam 36 travels toward the outlet 22 of the head 12 to a trailing beam focusing lens 72. The trailing beam focusing lens 72 focuses the trailing beam 36 to the desired focal plane. The trailing beam focusing lens 72, similarly to the leading beam focusing lens 46, is mounted to another support bracket 74 that is slidably moveable along an inner surface of the housing cover 13. To adjust a focus of the lens 72, an adjustment device 76 that is coupled to the support bracket 74 is engaged to slide the support bracket 74 and focusing lens 72 in a direction between the trailing beam reflecting mirror 40 and the outlet 22 of the head 12. Adjustment device 76 may be reached by removing cover plate 53 from housing cover 13 (see FIG. 2A).

It is preferable that the focal plane of the trailing beam 36 matches that of the leading beam 34, but the present teachings should not be limited to such a configuration. More particularly, it should be understood that the leading and trailing beams 34 and 36 may be focused at differing focal planes in accordance with the welding task at hand. After passing through the trailing beam focusing lens 72, the trailing beam 36 passes through the cover glass 52 and cross jet device 54 located at an outlet 22 of the head 12.

Changing the inter-spot distance requires moving the mirror 40 and focusing lens 72 of the trailing beam 36 only. That is, the mirror 40 and focusing lens 72 are mounted to adjustment plate 62 which in turn is mounted to inter spot distance adjustment plate 63. By rotating adjustment knob 26 (see FIG. 2B), adjustment plate 62, and mirror 40 and focusing lens 72, may be actuated toward and away from an edge 65 of housing plate 15. In this manner, the inter-spot distance between the leading beam 34 and trailing beam 36 may be adjusted. It should also be understood that the focusing lenses 46 and 72 for the leading and trailing beams, respectively, can be adjusted individually. In this manner, the spot size of the leading and trailing beams 32 and 34 may be adjusted. Further, if a different shaped beam is being used (e.g., elongated or a customized shape) for the trailing beam 36, the focusing lens 72 can be adjusted to change a size of the shape.

Figure 4:
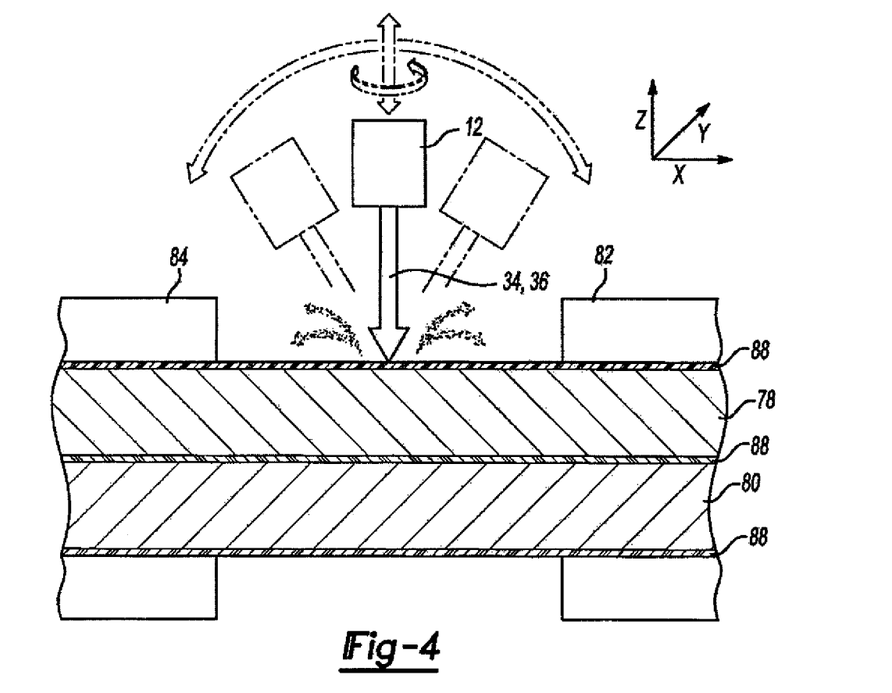
FIG. 4 is a front perspective view of the laser head engaging a pair of laser beams to a pair of substrates to be welded.

Now referring to FIG. 4, a welding method using the welding system according to the present teachings will now be described. FIG. 4 is a cross-sectional view showing a pair of substrates 78 and 80 held together by a pair of clamps 82 and 84 so that there is no gap, or at least no intended gap, between them. The use of clamps 82 and 84 ensures that the substrates 78 and 80 remain stationary during the welding process, as well as ensure that there is no gap, or at least no intended gap, between them. It should be understood, however, that the present teachings do not require the use of clamps 82 and 84. That is, it is contemplated that merely resting the substrates 78 and 80 on top of one another is sufficient such that there is no gap, or at least no intended gap, between them. As also shown in FIG. 4, it can be seen that beams 34 and 36 are directed toward the substrates 78 and 80 from the head 12 to connect the substrates 78 and 80 via a weld.

Figure 5:
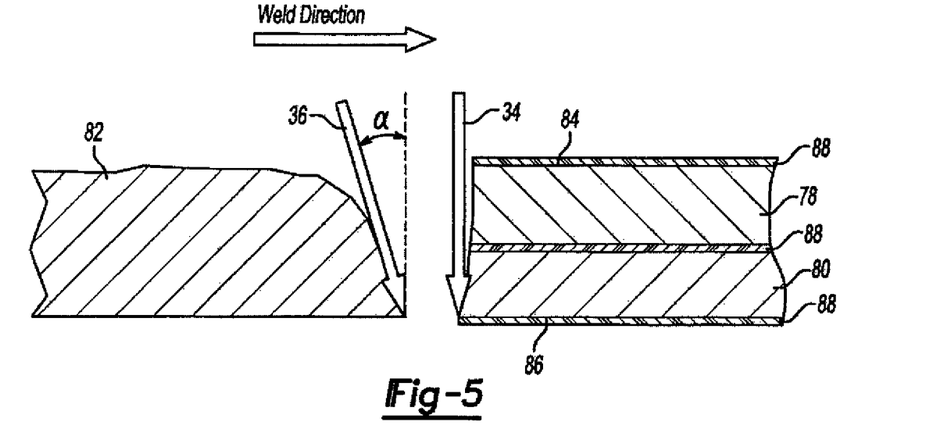
FIG. 5 is a cross-sectional view of a pair of beams engaging a pair of substrates to be welded.

Now referring to FIG. 5, the pair of substrates 78 and 80 are disposed on top of each other such that there is no gap, or at least no intended gap, between them. To weld each of these substrates 78 and 80 together, the first beam 34 (leading beam) and the second beam 36 (trailing beam) move across the substrates 78 and 80 in a welding direction. As the beams 34 and 36 move across the substrates 78 and 80, the substrates 78 and 80 are sufficiently heated and melted to form a molten pool 82. The molten pool, or weld pool 82, subsequently forms the weld between the substrates 78 and 80 upon cooling.

The leading beam 34 is aligned with the substrates 78 and 80 to be substantially orthogonal to the substrates 78 and 80. With respect to the trailing beam 36, this beam is angled relative to an orientation of the leading beam 34 by adjusting an angular position of the trailing beam adjustment plate 62. As shown in FIG. 5, the trailing beam 36 is angled from the leading beam 34 by an angle α. In this regard, it is preferred that the angle by which the trailing beam 36 is angled relative to the leading beam 34 is preferably between 10° and 20°, and more preferably between 10° and 15°. Further, the center of each beam (i.e., a center of each spot) is preferably aligned to be parallel along the weld direction.

It should be understood, however, that the leading beam 34 is not required to be normal to the pair of substrates 78 and 80. In contrast, the leading beam 34 can be angled relative to the substrates 78 and 80 as well. In this regard, it should be understood that the leading beam 34 can be angled in a forward direction, (i.e., in the weld direction) or in a rearward direction (i.e., against the weld direction) by adjusting an orientation of the head 12 with robot 14. It is preferred, however, that if the leading beam 34 is to be tilted, then it should be tilted in the rearward direction.

When engaging the beams 34 and 36 to the substrates 78 and 80, the beams 34 and 36 should be focused at a depth that ranges from an upper surface 84 of the upper substrate 78 to a lower surface 86 of the lower substrate 80. This depth is dependent on a number of parameters including a thickness of the substrates 78 and 80, a thickness of the coatings 88, a power of the laser device 16, etc. By selecting a focus depth according to the predetermined parameters, each of the beams 34 and 36 can sufficiently engage the substrates 78 and 80 at an intensity that sufficiently melts the substrates 78 and 80 to provide a uniform weld pool 82 in the welding direction. Further, it should be understood that each beam may be focused at different depths by adjusting the focusing lenses 46 and 72.

The laser device 16 used to weld the substrates 78 and 80 together may be any type of laser device known to one skilled in the art. In this regard, however, a laser device such as a Nd:YAG laser, a $CO_2$ laser, and a fiber ytterbium laser (Yb) are preferred. With respect to a power of these lasers, it should be understood that these lasers are currently commercially available at wattages that range from 1 kW to 30 kW. It should be understood, however, that any power suitable for use of these lasers may be used in accordance with the present teachings. Preferably, the laser device 16 has a power in the range of 4 kW to 10 kW.

Moreover, although not shown in FIG. 5, it should be understood that a shape of the beams 34 and 36 can be any shape known to those skilled in the art. In this regard, the shape or imprint of the beams 34 and 36 may be circular, elliptical, square, rectangular, horseshoe, crescent-shaped, or the like without departing from the spirit and scope of the present teachings. The shape of the beams 34 and 36 is adjustable in that focusing lenses 46 and 72 may be comprised of a plurality of differently-shaped lenses that modify the beams 34 and 36 to the desired shape.

A distance between the beams 34 and 36, a so-called inter-beam distance (i.e., inter-spot), may be determined by the various parameters associated with the welding conditions. That is, the inter-beam distance between the leading beam 34 and the trailing beam 36 will be calculated on a case-by-case basis. Various parameters that should be considered include a thickness of the substrates 78 and 80, the power (wattage) of the laser 16, the type of laser 16 being used, welding speed, and a thickness of any coating 88 that may be disposed on the substrates 78 and 80. Additional factors include a length of the weld and the type of material being used as the substrates 78 and 80.

Each of these factors should be taken into consideration because if the beams 34 and 36 are separated by too great a distance, the trailing beam 36 may generate a concavity in the rear keyhole wall, or an indentation may form in a sidewall of the keyhole. The generation of the concavity or indentation results in a non-stable structure for the molten metal in the weld pool 82 at the keyhole walls that further results in spattering and porosity in the weld. As a result, it is preferred that the inter-beam distance is between −2 and 2 mm, more preferably between 0 and 1.2 mm, and most preferably between 0.6 to 0.9 mm. With these inter-beam distances, it should be understood and appreciated that beams 34 and 36 may overlap. By overlapping the beams 34 and 36, an increase in power density may be achieved which may result in the laser beams 34 and 36 more fully engaging the substrates 78 and 80.

The beam strengths are dependent on the type of laser being used, the laser wattage associated with the laser, and whether the beams 34 and 36 are overlapped. It should be understood, however, that the leading beam 34 opens the keyhole in the substrates 78 and 80 and the second beam 36 (trailing beam) expands and controls the shape of the keyhole. The shape and orientation of the keyhole is important to controlling the robustness of the welding process and whether or not the weld results in a satisfactory joining of the substrates.

With respect to the types of substrates 78 and 80 that may be used, it should be understood that in an automotive application the substrates 78 and 80 are generally steel that are coated with zinc (Zn). Although Zn is preferably used to galvanize or galvanneal the steel substrates 78 and 80, it should be understood that the present teachings are also applicable to steel substrates that have been coated with other materials. In this regard, it should be understood that in addition to a Zn coating, a magnesium-based (Mg) coating, an aluminum-based (Al) coating, an adhesive coating, or a plastic coating such as polypropylene may be coated on the steel substrates 78 and 80 without affecting the use of the present teachings. Moreover, the present teachings are also applicable to substrates 78 and 80 formed of a material other than steel. In this regard, materials such as aluminum, magnesium, iron, other metals, or alloys thereof may be used.

While the above description of a leading beam 34 and a trailing beam 36 has been described relative to welding a pair of substrates 78 and 80 that overlap each other, it should be understood that the present teachings should not be limited thereto. More particularly, referring to FIG. 6, a dual beam welding method is shown that is beneficial during a deep penetration welding process. The deep penetration welding process may be used when welding a pair of substrates 78 and 80 that must be connected at a location deeper (i.e., at least 6 mm below a surface of the substrate) than a location that is normally used to connect a pair of substrates 78 and 80. For example, welding an engine block or transmission component at an edge of the block or component, respectively, to another substrate.

Figure 6:
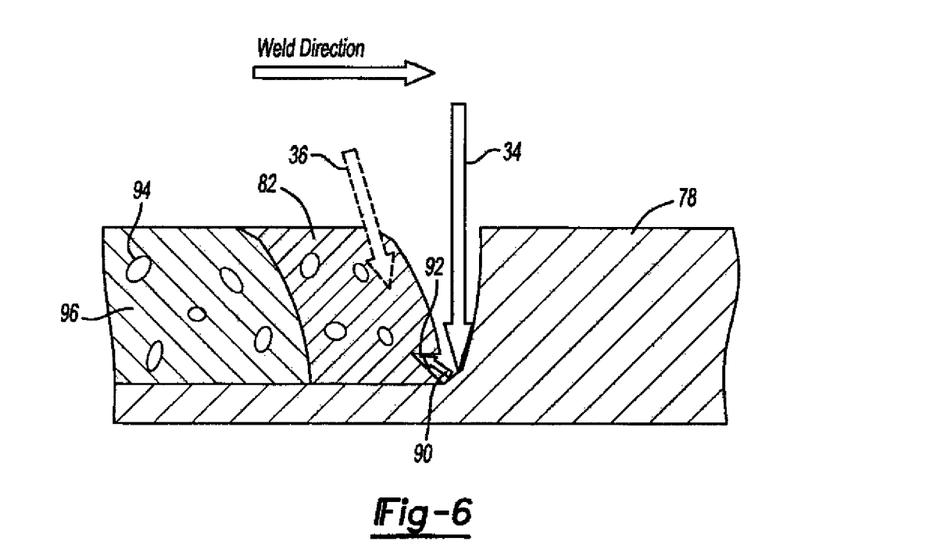
FIG. 6 is a cross-sectional view of a pair of beams engaging a substrate to be welded in a deep penetration welding method.

Referring to FIG. 6, it can be seen that the leading beam 34 substantially penetrates a distance into the substrate 78. A problem that arises during these deep penetrations, however, is that the deeply penetrating leading beam 34 may reflect off a surface of the substrate 78 at a root (i.e., bottom) of the keyhole and become a reflected beam 90 that penetrates into the molten pool 82. The reflected beam 90 may form a bump or surface concavity 92 in the molten pool 82 that, as the leading beam 34 moves in the welding direction, will be swallowed by the molten pool 82. Once the bump 92 is swallowed, a pore 94 forms in the weld pool 82 as well as the solidified weld 96. This is undesirable in that a porous weld 96 may be relatively weak.

To combat the formation of the bumps 92 and pores 94, the trailing beam 36 (shown in phantom in FIG. 6) angled relative to the leading beam 34 smoothes the molten pool 82 such that the reflected beam 90 does not impinge the molten pool 82 at an angle sufficient to form a bump 92. The smoothing of the molten pool 82 may be adjusted according to an angle of the trailing beam 36. That is, the trailing beam 36 may be angled relative to the leading beam 34 to eliminate, or at least substantially minimize, the formation of bumps 92 that lead to the formation of pores 94.

Figures 7A, 7B:
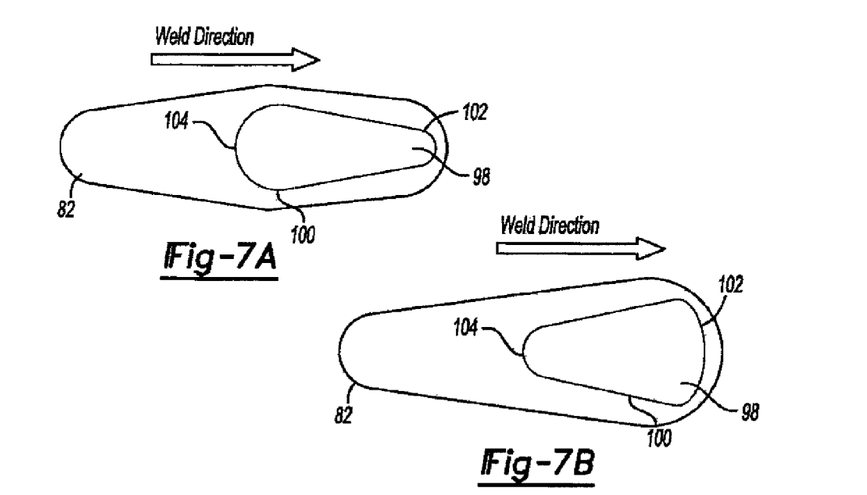
FIGS. 7A and 7B are top perspective views of keyholes formed using the welding system according to the present teachings.

Now referring to FIGS. 7A and 7B, the keyhole geometry described above will be more fully described. In FIG. 7A, the keyhole 98 when viewed in plan is essentially a conical shape 100 with a rounded first end 102 and second end 104. The first end 102 is formed by the leading beam 34 and the expanding conical shape 100, as well as the rounded second end 104, are formed by the trailing beam 36 which controls and shapes the keyhole 98.

The keyhole 98 is an important aspect of the present teachings because the formation and configuration of the keyhole 98 assists in the expulsion of the gas of the coating 88 that is formed during the welding process. When the substrates 78 and 80 are coated with a coating 88 such as Zn, Mg, Al, or the like, these materials have a boiling temperature that is less than a melting temperature of the steel substrates 78 and 80. As such, during the welding process, these elements are emitted as a gas. Controlling the evacuation of these gases is important to forming a satisfactory weld that securely fastens each of the substrates 78 and 80 together. This is because the emission of these gasses without controlled evacuation during the welding process may result in spattering and/or a porous weld which can lead to a weak connection between the substrates 78 and 80.

Controlling the evacuation of coating gases has a profound effect on the formation of the weld. The expulsion of the gases can be controlled according to Bernoulli's Law which states that $P_1 V_1 = P_2 V_2$.

According to Bernoulli's law, in a tube having varying diameters, the product of gas pressure and gas velocity is constant, independent of a change in tube size. In areas having a small diameter cross-section, the gas has a high velocity and low pressure. In contrast, in areas with a large diameter cross-section, the gas has a low velocity and high pressure. Using this principle, the configuration of the keyhole 98 can be used to control gas evacuation which in turn improves the properties of the weld.

The leading beam 34 creates the narrow portion of the conical structure 100 of the keyhole 98. In this narrow portion of the keyhole 98, the gas will have high velocity and low pressure. The momentum of the gas is opposite the welding direction and believed to be proportional with the welding speed, as well as affected by coating thickness and type.

The trailing beam 36 controls the formation of the remaining portions 104 of the keyhole 98 to have a wider area 104. In the wider area, the gas will have a low velocity and higher pressure. Due to this increase in the size of the keyhole 98, the velocity of the gas in the keyhole 98 sufficiently slows so that the gas does not impinge on a rear surface 104 of the keyhole 98. In other words, the gas velocity is slowed enough to allow the gas to expel in various directions without contacting a rear surface 104 of the keyhole 98. This prevents, or at least substantially minimizes the spattering caused by the emission of gas from the zinc coating or any other coating. Further, the emission of the coating gas before it impinges on a rear surface 104 of the keyhole 98 also reduces the effect of the weld being porous. Again, this results in a more satisfactory weld bead which increases strength of the weld joining the two substrates.

In contrast, a keyhole 98 as shown in FIG. 7B will not have the desired effect of expelling gas that arises from the coated substrates. Instead, the opposite effect will occur in that the velocity of the gas will increase as it moves toward the rear keyhole wall 104. Again, this is undesirable because gas impinging on the rear keyhole wall 104 increases the likelihood of spattering in the weld.

Although the keyhole 98 shown in FIG. 7A is shown to have smooth sides, the shape of the keyhole 98 can be varied depending on the type of substrates 78 and 80 being used, a thickness of the substrates 78 and 80, a coating thickness, a power of the beams 34 and 36, a diameter of the beams 34 and 36 (or imprint of the beams on the substrates), etc. The primary method of increasing the second or trailing end 104 of the keyhole 98, however, is to use a trailing beam 36 that has a larger beam diameter or imprint compared to the leading beam 34. Preferably, the trailing beam 36 has a beam diameter in the range of 0.03 to 4.00 mm, while the leading beam 34 has a beam diameter in the range of 0.02 to 2.00 mm. More preferably, the trailing beam 36 has a beam diameter in the range of 0.4 to 0.8 mm, while the leading beam has a beam diameter in the range of 0.1 to 0.4 mm. Notwithstanding, one skilled in the art will readily acknowledge and appreciate that various parameters of the welding process can be adjusted according to the specific task where the welding of the present teachings is being used to make the present teachings adaptable to a variety of applications, including automotive applications. In addition to having a smaller spot size, the leading beam 34 can be independently adjusted to have a larger depth of focus to assist in forming the opening of the keyhole 98.

Although a smoothly formed keyhole 98 similar to that shown in FIG. 7A is preferred, other keyhole shapes can be formed without departing from the scope of the present teachings. To form different keyhole shapes, the inter-beam distance may be altered, or the beams 34 and 36 may be off-set from one another. More specifically, referring to FIGS. 8A and 8B, it can be seen that the planes of the trailing and leading beams 34 and 36 can be varied.

Figure 8A:
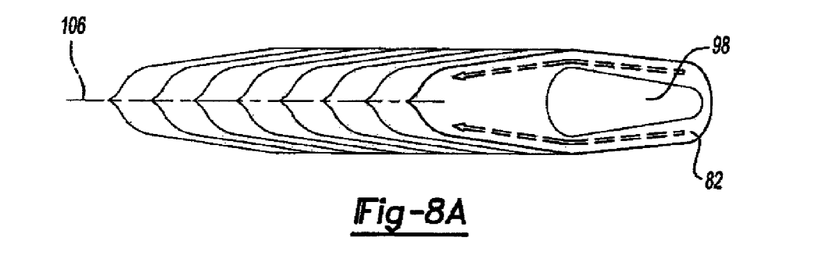
FIGS. 8A and 8B are top perspective view of keyholes and weld pools formed using the welding system according to the present teachings.
Figure 8B:
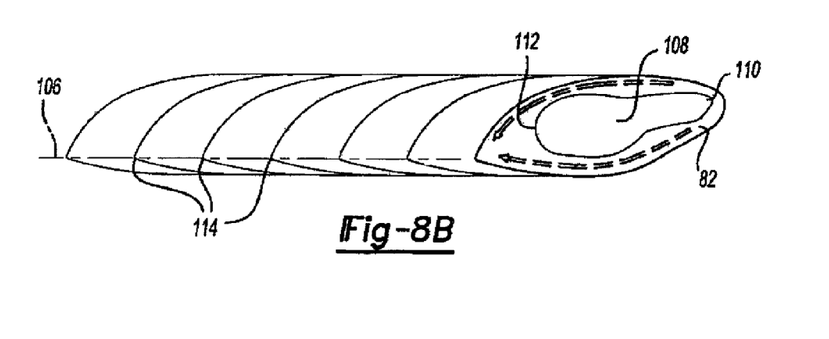

As shown in FIG. 8A, each of the beams follows a specific line or axis 106. That is, a center of each of the beams intersects with this axis 106 such that a keyhole 98 similar to that shown in FIG. 7A is formed. In contrast, as shown in FIG. 8B, the leading beam 34 may follow an axis that is offset from the axis 106 of the trailing beam 36 to make a shape of the keyhole 98 irregular. This is done by rotating the head 12 about the Z axis relative to the substrates 78 and 80. This irregular or non-symmetric keyhole 108 may be desirable in various applications such as when welding substrates at joints or edges. Moreover, the non-symmetric keyhole 108 will have a non-symmetric flow of the molten material 82 as indicated by the arrows. The non-symmetric flow is advantageous in that it eliminates, or at least substantially minimizes, a center-axis porosity of the weld by separating the location of where the two side streams of molten material 82 flowing from the first end 110 toward the second end 112 of the keyhole 108 meet. Further, the non-symmetric flow changes a location of the last solidification point 114 of the molten alloy 82 which also assists in reducing porosity of the weld. Yet another benefit of this non-symmetric flow configuration is the intentional separation of the final solidification surface from the axis where a porosity may form. In this way, the weld's mechanical properties are improved (i.e., strengthened).

As described above, the present teachings are advantageous when welding substrates 78 and 80 that are disposed over each other with no gap, or at least no intended gap, between them. It should be understood, however, that the present teachings are also advantageously applicable to additional substrate configurations. FIGS. 9A to 9D depict additional substrate configurations that can be welded using the present teachings. In these various configurations, it should also be understood that the dual beams of the present teachings are advantageous because "fit-up" problems between the substrates 78 and 80 may occur during production. That is, various tolerances of the substrates 78 and 80 or other factors may cause the substrates 78 and 80 to not "fit-up" prior to welding. Notwithstanding, with the welding system 10 of the present teachings, a more robust process is achievable in that the beams may be oriented in a plurality of positions that assist in overcoming the fit-up problems. In addition, a higher quality weld is achievable, as well as increased productivity.

Figure 9A:
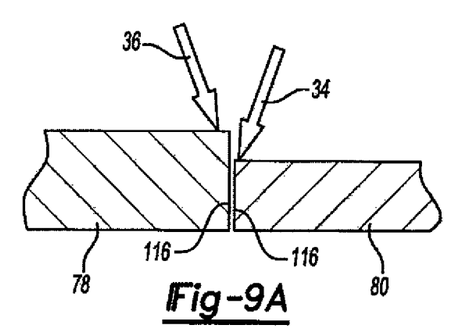
FIGS. 9A to 9D are cross-sectional views of various stack-ups of substrates that may be welded together using the welding system of the present teachings.

FIG. 9A depicts a configuration where edges 116 of the substrates 78 and 80 abut each other. The welding of plates 78 and 80 in this manner is a butt welding. As shown in FIG. 9A, the welding head 12 may be rotated 90° about the Z axis relative to the substrates 78 and 80 so that the first and second beams 34 and 36 are disposed laterally to each other when moving in a weld direction instead of "following" each other when the beams 34 and 36 are in an axis that matches the weld direction. Because the head 12 is movable through a plurality of points, the beams 34 and 36 may be angled so that the beams 34 and 36 engage the substrates 78 and 80 at an angle sufficient to melt the substrates 78 and 80 and weld them together. In this regard, it should be understood that the head 12, may be angled at any position that sufficiently enables the substrates 78 and 80 to be welded.

This configuration is also advantageous when, as shown in FIG. 9A, the substrates 78 and 80 to be welded include different thicknesses. Moreover, because an intensity of each beam 34 and 36 may be adjusted, a thicker substrate may be engaged by a beam with a higher power relative to a beam that engages a thinner plate. Although substrates 78 and 80 including different thicknesses are shown in FIG. 9A, it should be noted that the present teachings are adaptable to butt welding substrates 78 and 80 with substantially equal thicknesses as well.

Figure 9B:
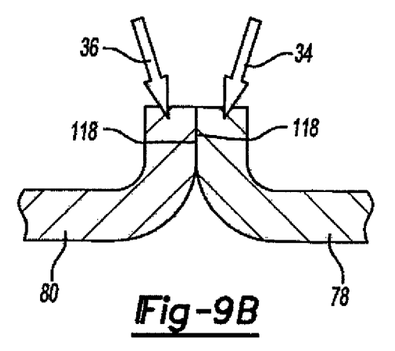

FIG. 9B shows a configuration where bent edges 118 of the substrates 78 and 80 meet each other. This configuration is an edge welding configuration, and the welding head 12 may again be rotated 90° about the z axis so that the first and second beams 34 and 36 are disposed laterally relative to each other. Although substrates 78 and 80 including the same thickness are used in FIG. 9B, it should be understood that substrates 78 and 80 with different thicknesses may be welded together without departing from the scope of the present teachings.

Figure 9C:
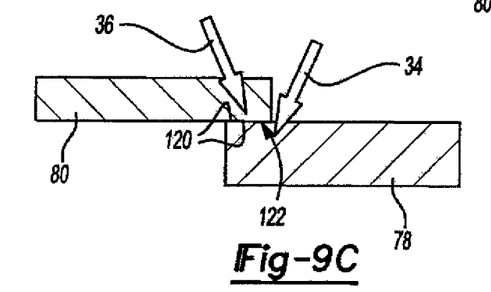

FIG. 9C is a configuration where edges 120 of the substrates 78 and 80 overlap each other to form a lap joint 122. In this configuration, the welding head 12 may be rotated 90° about the z-axis so that the first and second beams 34 and 36 are disposed laterally to each other. Alternatively, the beams 34 and 36 may be aligned in a plane that is in line with a weld direction. Regardless, it should be understood that the beams 34 and 36 may moved in various positions relative to each other to ensure a proper weld between the substrates 78 and 80.

Figure 9D:
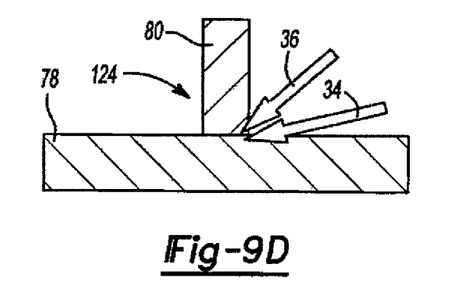

Now referring to FIG. 9D, the substrates 78 and 80 are in a T-joint configuration 124. When the substrates 78 and 80 are disposed in a T-joint configuration 124, the welding head 12 may be rotated 90° about the z-axis as well as angled relative (i.e., rotated about the x- or y-axis) to the T-joint 124 so that the first and second beams 34 and 36 are disposed laterally while engaging the substrates 78 and 80 in an angled manner. The maneuverability of the head 12 enables the beams 34 and 36 to precisely engage the substrates 78 and 80 in the T-joint 124 at the necessary angle to ensure a sufficient weld. Again, it should also be understood that the intensity of the beams 34 and 36 may also be properly adapted to properly connect the substrates 78 and 80.

It should be understood that although the head 12 has been described above as being rotatable 90°, the head 12 in actuality may be rotated through 360° such that the beams 34 and 36 can be positioned relative to the substrates 78 and 80 in a variety of positions. For example, the head 12 may be rotated through an angle that enables the beams 34 and 36 to form a weld pool 82 similar to that shown in FIG. 8B, even when welding substrates 78 and 80 in the configurations shown in FIGS. 9A to 9D. In this manner, the head 12 may be moved such that the beams 34 and 36 are capable to engage the substrates 78 and 80 in way that joins them with a weld bead that is mechanically strong and non-porous.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A welding head comprising:
   a housing;
   a laser device attached to said housing, said laser device for emitting radiation into said housing;
   a beam splitter located within said housing inboard from said laser device, said beam splitter operable to form a leading beam by allowing radiation with low divergence to pass through to a first optical path, and operable to form a trailing beam by deflecting radiation with high divergence to a second optical path;
   a reflective mirror in said second optical path, said reflective mirror adapted to reflect said trailing beam to a third optical path; and
   a plurality of focusing lenses, a first focusing lens disposed in said first optical path and operable to focus said leading beam, and a second focusing lens disposed in said third optical path and operable to focus said trailing beam,
   wherein said beam splitter is mounted to a stage that is linearly movable along an optical axis of said radiation emitted from said laser device to adjust a power ratio of said leading and trailing beams; and said reflective mirror is connected to said stage such that said reflective mirror is simultaneously movable with said stage to maintain optical alignment with said beam splitter.

2. The device of claim 1, wherein said reflective mirror is movable along said second optical path to adjust an angle of said trailing beam in said third optical path relative to said leading beam in said first optical path.

3. The device of claim 1, wherein said plurality of focusing lenses are operable to adjust a focus of said leading beam independently from a focus of said trailing beam, and said plurality of focusing lenses are operable to adjust a focus of said trailing beam independently from said leading beam.

4. The device of claim 1, further comprising a plurality of collimating lenses, said collimating lenses being disposed in said first and second optical paths.

5. The device of claim 1, wherein said housing is connected to robot that is movable through a plurality of positions.

6. A welding system comprising:
a housing including an inlet and an outlet;
a laser device mounted to said inlet, said laser device adapted to emit a beam of radiation into said housing; and
an optical system disposed in said housing between said inlet and said outlet, said optical system including:
a beam splitter mounted to a stage that is linearly movable along an optical axis of said radiation emitted from said laser device adapted to transmit a portion of said radiation along a first optical path to form a leading beam, and adapted to deflect a portion of said radiation along a second optical path to form a trailing beam;
a reflective mirror disposed in said second optical path for reflecting said trailing beam toward said outlet of said housing, said reflective mirror being attached to said stage such that when said stage and said beam splitter are linearly moved, said reflective mirror simultaneously moves to maintain optical alignment with said beam splitter;
at least one focusing lens disposed in said first optical path between said beam splitter and said outlet for focusing said leading beam; and
at least one focusing lens disposed in said second optical path between said reflective mirror and said outlet for focusing said trailing beam,
wherein said beam splitter, said reflective mirror, and said focusing lenses in said first and second optical paths are each independently adjustable, and
a position of said beam splitter relative to said laser device adjusts a power ratio of said leading and trailing beams.

7. The system according to claim 6, wherein a position of said reflective mirror relative to said beam splitter adjusts an angle between said leading and trailing beams.

8. The system according to claim 6, wherein a position of said at least one focusing lens in said first optical path adjusts a spot size of said leading beam.

9. The system according to claim 6, wherein a position of said another at least one focusing lens in said second optical path adjusts a shape of said trailing beam.

10. A welding method comprising:
emitting radiation from a laser device along an optical axis toward a beam splitter, said beam splitter being mounted to a stage that is movable along an axis that is parallel to said optical axis;
transmitting a portion of said radiation through said beam splitter along a first optical path to form a leading beam, and deflecting another portion of said radiation with said beam splitter along a second optical path to form a trailing beam, a position of said beam splitter along said optical axis relative to said laser device adjusts a power ratio of said leading and trailing beams;
reflecting said trailing beam with a reflective mirror disposed in said second optical path, said reflective mirror reflecting said trailing beam to a third optical path and said reflective mirror being connected to and simultaneously movable with said stage to maintain optical alignment with said beam splitter; and
passing said leading beam through a first focusing lens disposed in said first optical path and operable to focus said leading beam, and passing said trailing beam through a second focusing lens disposed in said third optical path and operable to focus said trailing beam;
controlling characteristics of said leading and trailing beams; and
engaging said leading and trailing beams to a pair of substrates to weld said substrates together,
wherein said step of controlling characteristics of said leading and trailing beams enables the engagement of said leading and trailing beams to said substrates to form a keyhole with a leading and trailing end, the leading end being smaller than the trailing end.

11. The method of claim 10, wherein said characteristics of said leading and trailing beams include an angle between said leading and trailing beams, a focus of said leading and trailing beams, and an interbeam distance.

12. The method of claim 10, wherein said substrates include a coating having a boiling temperature less than a melting temperature of said substrates.

13. The method of claim 12, wherein said coating is expelled from said keyhole during welding.

14. The method of claim 10, wherein said leading beam opens said leading end of said keyhole, and said trailing beam controls formation of said trailing end of said keyhole.

15. The method of claim 10, wherein said substrates are arranged in at least one of a butt-welding configuration, an edge welding configuration, an overlap configuration, and a T-joint configuration.

* * * * *